United States Patent
McGuire et al.

(10) Patent No.: US 11,609,837 B2
(45) Date of Patent: Mar. 21, 2023

(54) CALIBRATION TECHNIQUE USING COMPUTER ANALYSIS FOR ASCERTAINING PERFORMANCE OF CONTAINERS

(71) Applicant: Kyndryl, Inc., New York, NY (US)

(72) Inventors: Michael James McGuire, Sydney (AU); James David Cleaver, Grose Wold (AU); Pramod Vadayadiyil Raveendran, Machiplavu (IN); Seema Nagar, Bangalore (IN); Kuntal Dey, Rampurhat (IN); Thuy Luong, Kellyville (AU)

(73) Assignee: Kyndryl, Inc., New York, NY (US)

( * ) Notice: Subject to any disclaimer, the term of this patent is extended or adjusted under 35 U.S.C. 154(b) by 38 days.

(21) Appl. No.: 17/303,585

(22) Filed: Jun. 2, 2021

(65) Prior Publication Data
US 2022/0391302 A1    Dec. 8, 2022

(51) Int. Cl.
G06F 11/34 (2006.01)
G06F 11/30 (2006.01)
G06F 8/71 (2018.01)

(52) U.S. Cl.
CPC ........ *G06F 11/3428* (2013.01); *G06F 11/302* (2013.01); *G06F 8/71* (2013.01)

(58) Field of Classification Search
CPC ....... G06F 11/302; G06F 11/3428; G06F 8/71
USPC ........................................................ 702/186
See application file for complete search history.

(56) References Cited

U.S. PATENT DOCUMENTS

| | | | |
|---|---|---|---|
| 8,850,432 B2 | 9/2014 | McGrath | |
| 8,904,402 B2 | 12/2014 | McGrath | |
| 11,106,560 B2* | 8/2021 | Vijendra | G06F 11/3024 |
| 2018/0196741 A1 | 7/2018 | Qureshi | |
| 2018/0349168 A1* | 12/2018 | Ahmed | G06F 9/45558 |

(Continued)

FOREIGN PATENT DOCUMENTS

CN         106708622 B         6/2020

OTHER PUBLICATIONS

Karn, Richa, "Analyzing Docker Container Performance With Native Tools", Crate.io, Oct. 16, 2017, 15 pages, <https://crate.io/a/analyzing-docker-container-performance-native-tools/>.

(Continued)

*Primary Examiner* — John H Le
(74) *Attorney, Agent, or Firm* — John Kennel, Esq.; Kevin P. Radigan, Esq.; Heslin Rothenberg Farley & Mesiti P.C.

(57) ABSTRACT

Monitoring and enhancing performance of containers using a calibration technique is implemented using a computer. Performance of a new container as part of an application running on the computer is checked by comparing a current performance of the new container with baseline data corresponding to the new container. The baseline data is derived from a calibration container corresponding to the new container. The new container is categorized in a category of performance based on the checking of the performance of the new container. An alert can be sent to a device of an administrator regarding the new container meeting a threshold of performance, in response to the new container meeting the threshold of performance. The alert can be sent to the device of the administrator for the administrator to initiate an action pertaining to the new container in response to receiving the alert.

19 Claims, 9 Drawing Sheets

(56) References Cited

U.S. PATENT DOCUMENTS

| | | |
|---|---|---|
| 2019/0171811 A1 | 6/2019 | Daniel |
| 2020/0014698 A1 | 1/2020 | Nambiar |
| 2020/0233961 A1* | 7/2020 | Wolfin .................. G06F 21/566 |

OTHER PUBLICATIONS

Linthicum, David, "You've heard the benefits of containers, now understand the challenges", TechBeacon, last printed Jun. 2, 2021, 5 pages, <https://techbeacon.com/enterprise-it/youve-heard-benefits-containers-now-understand-challenges>.

Mell, et al., "The NIST Definition of Cloud Computing", National Institute of Standards and Technology, Special Publication 800-145, Sep. 2011, 7 pages.

* cited by examiner

CALIBRATION TECHNIQUE USING COMPUTER ANALYSIS FOR ASCERTAINING PERFORMANCE OF CONTAINERS

BACKGROUND

The present disclosure relates to containers in software applications and more particularly to monitoring and enhancing performance of containers in software applications.

Software containers can provide software deliverable in packages. In one example, containers can be a bundle of software, and can also be isolated from each other, but communicate with each other. In software development, developers can launch containers at a rapid rate. Tools are available for monitoring containers. However, developers can neglect scaling down the number of containers from a development/test to deployment, and to clean up old images from the repository, and to clean up old instances of running containers. Containers can be mismanaged for many reasons such as lack of interest, and lack of monitoring. Such unused or underutilized containers can increase costs without much or any benefit. Such containers are not properly service managed or not even monitored. Additionally, developers can lack the data/insights as to whether code changes improve or decrease performance of a component/application.

For example, in the public cloud space, occurrences such as above could have a negative impact on cost, because cloud usage can be increased when the above issues are not addressed.

SUMMARY

The present disclosure recognizes the shortcomings and problems associated with current techniques for monitoring and enhancing performance of containers by using a calibration technique. The technology according to the present invention can lead to reduced cloud usage by scaling down the number of containers from a development/rest deployment, and using various clean ups such as cleaning up old images and old instances of containers.

In one example according to the present invention, a method and system can include, as new containers are deployed, creating an additional temporary instance of a container automatically in an isolated environment (e.g., separate container pod). The baseline attributes (e.g., image version) and performance of the isolated instance can be measured, including a CPU (central processing unit), memory, and network parameters, and in another example including disk input/output (I/O), CPU (central processing unit), memory, and sockets. The user deployed container is deployed as normal, and the ongoing performance of the actual instance is measured, including disk I/O, CPU, memory, and sockets. The method and system thus has a baseline and ongoing performance measurements which can be used to create a model. The method and system includes determining which containers are idle, and/or inactive, and determining which containers are scaled inefficiently (e.g. auto-scaling boundaries incorrect). A report can be generated and provided to a developer or administrator.

In one example, in one or more developer environments, hundreds of containers can be created and kept open (and without using it due to various reasons, which can include test, loss of awareness or contact, lost interest, missing the already created container details, etc.), and these can cause high cloud costs. Such containers cannot be properly service managed or not even monitored. There does not current exist a proper mechanism to find such idle containers. Calibration containers according to the present invention can provide a baseline for monitoring any activity/changes in the container. Typically, monitoring tools don't have a perfect baseline (and it is difficult to impose a manual baseline for each container in the environment) and the baseline (e.g., idleness) can vary for different types (and application) of containers. Not all idle containers consume equal resources, and the present invention provides a way to calibrate, and determine whether a container is doing anything without even monitoring it.

Calibration containers according to the present invention can perfect a baseline (by measuring the performance with respect to the baseline containers with the same type of resources/runtime/libraries etc.) to measure performance of a workload on the container based on workload type/size and input requests or load. Also, the present invention helps to measure behavior/misbehavior details based on the data collected through this method over a period of time.

One problem with current monitoring is they do not measure the idleness of a container using a monitoring tool because the baseline for that container is unknown (e.g., request on ports, ports opened while creation, CPU usage, memory usage etc.). For each container, the baseline may be different.

Using the present invention, all baseline data can be measured, compare with the same of actual running container, and a determination can be made as to whether the container is idle or not. Thereby, idle containers are detected and can be removed from a system. Also, impact of a load on the container is measured by having a perfect baseline specific to the type (and application) of container.

Calibration containers actually spin up, record baseline data into a database and shut down. And the same process may repeat when the container changes the environment or baseline becomes old based on a pre-defined threshold. Also, there can only be one such calibration container if multiple applications using the same image type without any change in input parameters (related to resource/ports etc.). Measuring idleness can be one aspect. The real input load and impact (performance behavior/misbehavior) can be measured based on a baseline. This can eliminate continuous monitoring, by simply periodic (or even by one-off) calibration and then overall container statistic collection, without disturbing the actually running container (e.g., in a new compute environment, simply bootstrap the calibrated baseline container, measure its resources, and thereby have a sense of the load of the other container without looking into it).

In an aspect according to the present invention, a computer-implemented method for monitoring and enhancing performance of containers using a calibration technique, comprising checking performance, using a computer, of a new container as part of an application running on the computer, by comparing a current performance of the new container with baseline data corresponding to the new container. The baseline data being derived from a calibration container corresponding to the new container. The method includes categorizing the new container in a category of performance based on the checking of the performance of the new container. The method includes determining when the new container meets a threshold of performance based on the category of performance for the new container. The method further includes sending an alert to a device of an administrator regarding the new container meeting the threshold of performance, in response to the new container meeting the threshold of performance, the alert being sent to the device of the administrator for the administrator to initiate an action pertaining to the new container in response to receiving the alert.

In a related aspect, the method further includes generating, using the computer, a calibration container in response to the new container being created in the application running on the computer; and receiving and storing the baseline data of operational performance and operational statistics of the calibration container in a database, the baseline data relating to the new container and being for calibrating the new container.

In a related aspect, the method further includes removing the calibration container in response to the storing of the baseline data.

In a related aspect, the method includes initiating an action regarding the new container, in response to the alert, the action being initiated by the administrator to address the new container meeting the threshold for performance, the threshold for performance indicating a lack of performance for the new container.

In a related aspect, the performance includes performance characteristics and the performance characteristics include a ranking of idleness of the new container.

In a related aspect, the performance includes performance characteristics and the performance characteristics include a ranking of idleness, and operation behavior.

In a related aspect, the category indicates a state of performance of the new container, the state of performance being based on a level of idleness of the new container, and the level of idleness being related to the threshold of performance.

In a related aspect, the method further includes: generating a model at least in part incorporating the calibration container; iteratively receiving the baseline data as at least part of the model; analyzing the iteratively received baseline data as at least part of the model; updating the categorization of the new container based in the analyzing of the iteratively received baseline data as at least part of the model; and wherein the determining when the new container meets the threshold of performance based on the category of performance, is based on the model.

In a related aspect, the method further includes a plurality of categories, and the plurality of categories each indicating a state of performance for the new container.

In a related aspect the method further includes: a plurality of categories, and the plurality of categories each indicating a state of performance for the new container; and wherein the categories each refer to a ranking of idleness for the new container.

In a related aspect, the categorizing of the new container is based on the checking of the performance which includes defining a variation from the baseline of the calibration container.

In a related aspect, the method further includes: a plurality of categories, and the categories each indicating a state of performance for the new container; and the state of performance for the new container being based on a variation from the baseline data corresponding to the new container.

In a related aspect, the plurality of categories includes a series of categories based on a ranking of idleness of the new container.

In a related aspect, the method further includes a plurality of categories, and the categories each indicating a state of performance for the new container, wherein the plurality of categories each refer to a ranking of idleness for the new container; and the plurality of categories includes a no-variation from the baseline category, a low variation from the baseline category, a medium variation from the baseline category, and high variation from the baseline category.

In a related aspect, the method further includes: generating another calibration container in response to another container being moved from one environment to another environment; and the calibration container and the another calibration container being related to the new container and the another container, respectively.

In a related aspect, the method further includes: a plurality of new containers having respective calibration containers being generated in response to the creating of the new containers; and checking performance, using the computer, of each of the new containers, by comparing a current performance for each of the new containers with baseline data corresponding to each of the new containers, the baseline data being derived from the calibration containers corresponding to each of the new containers; categorizing each of the new containers in a category of performance based on the checking of the performance for each of the new containers; determining when the new containers meets a threshold of performance based on the category of performance for each of the new containers; and sending an alert to the device of the administrator regarding each of the new containers meeting the threshold of performance, in response to the new containers meeting the threshold of performance, the alert being sent to the device of the administrator for the administrator to initiate an action pertaining to one or more of the new containers in response to receiving the alert.

In another aspect according to the present invention, a system uses a computer for monitoring and enhancing performance of containers using a calibration technique, which comprises: a computer system comprising; a computer processor, a computer-readable storage medium, and program instructions stored on the computer-readable storage medium being executable by the processor, to cause the computer system to perform the following functions to; check performance, using a computer, of the a new container as part of an application running on the computer, by comparing a current performance of the new container with baseline data corresponding to the new container, the baseline data being derived from a calibration container corresponding to the new container; categorize the new container in a category of performance based on the checking of the performance of the new container; determine when the new container meets a threshold of performance based on the category of performance for the new container; and send an alert to a device of an administrator regarding the new container meeting the threshold of performance, in response to the new container meeting the threshold of performance, the alert being sent to the device of the administrator for the administrator to initiate an action pertaining to the new container in response to receiving the alert.

In a related aspect, the system further includes: generating, using the computer, a calibration container in response to the new container being created in the application running on the computer; and receiving and storing the baseline data of operational performance and operational statistics of the calibration container in a database, the baseline data relating to the new container and being for calibrating the new container.

In a related aspect, the system further includes: removing the calibration container in response to the storing of the baseline data.

In another aspect according to the present invention, a computer program product for monitoring and enhancing performance of containers using a calibration technique, includes a computer readable storage medium having program instructions embodied therewith. The program instructions executable by a computer to cause the computer to perform functions, by the computer, comprising the functions to: check performance, using a computer, of the a new container as part of an application running on the computer, by comparing a current performance of the new container with baseline data corresponding to the new container, the baseline data being derived from a calibration container corresponding to the new container; categorize the new container in a category of performance based on the checking of the performance of the new container; determine when the new container meets a threshold of performance based on the category of performance for the new container; and send an alert to a device of an administrator regarding the new container meeting the threshold of performance, in response to the new container meeting the threshold of performance, the alert being sent to the device of the administrator for the administrator to initiate an action pertaining to the new container in response to receiving the alert.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Figure 1:
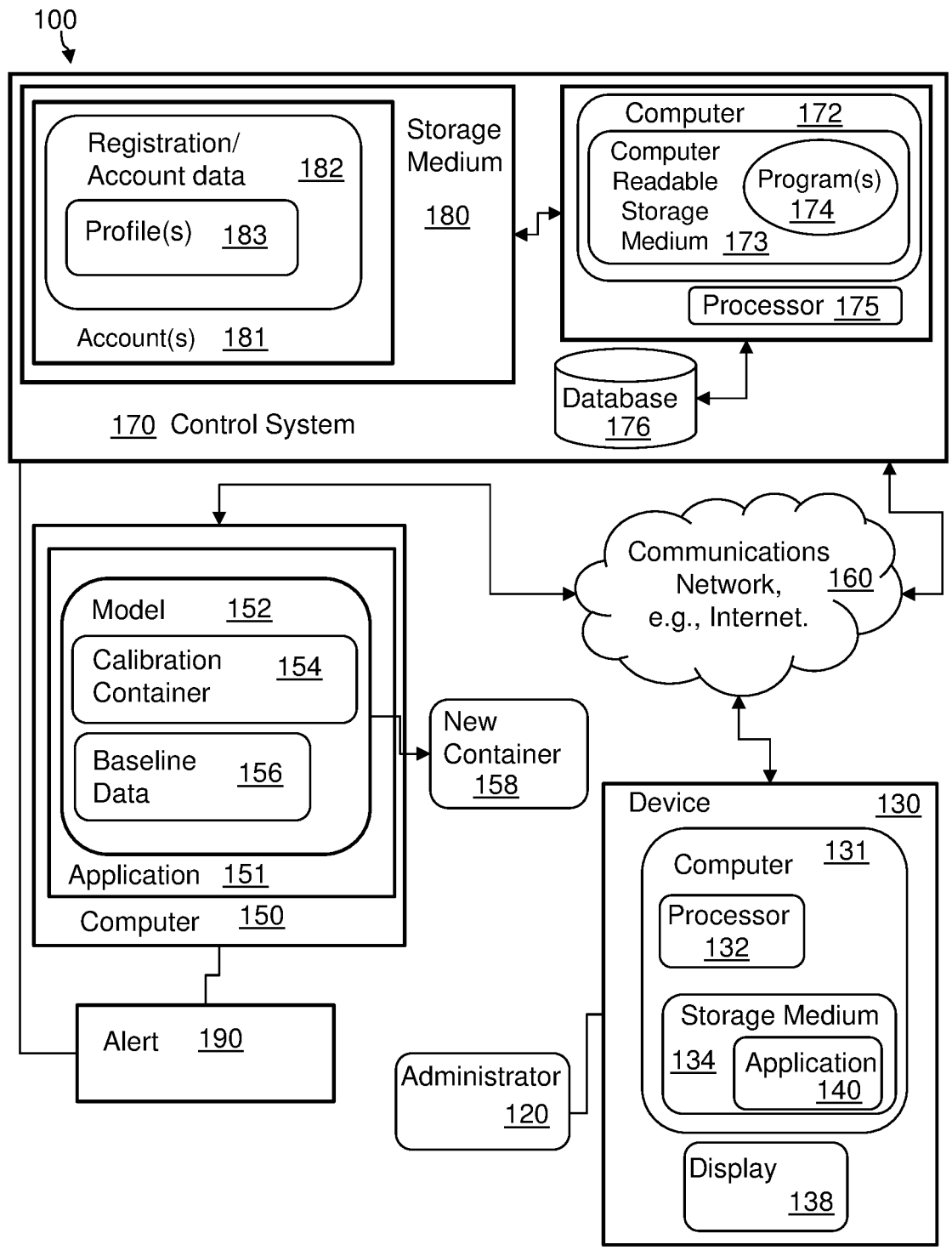
FIG. 1 is a schematic block diagram illustrating an overview of a system, system features or components, and methodology for monitoring and enhancing performance of containers using a calibration technique, according to an embodiment of the present disclosure.
Figure 2:
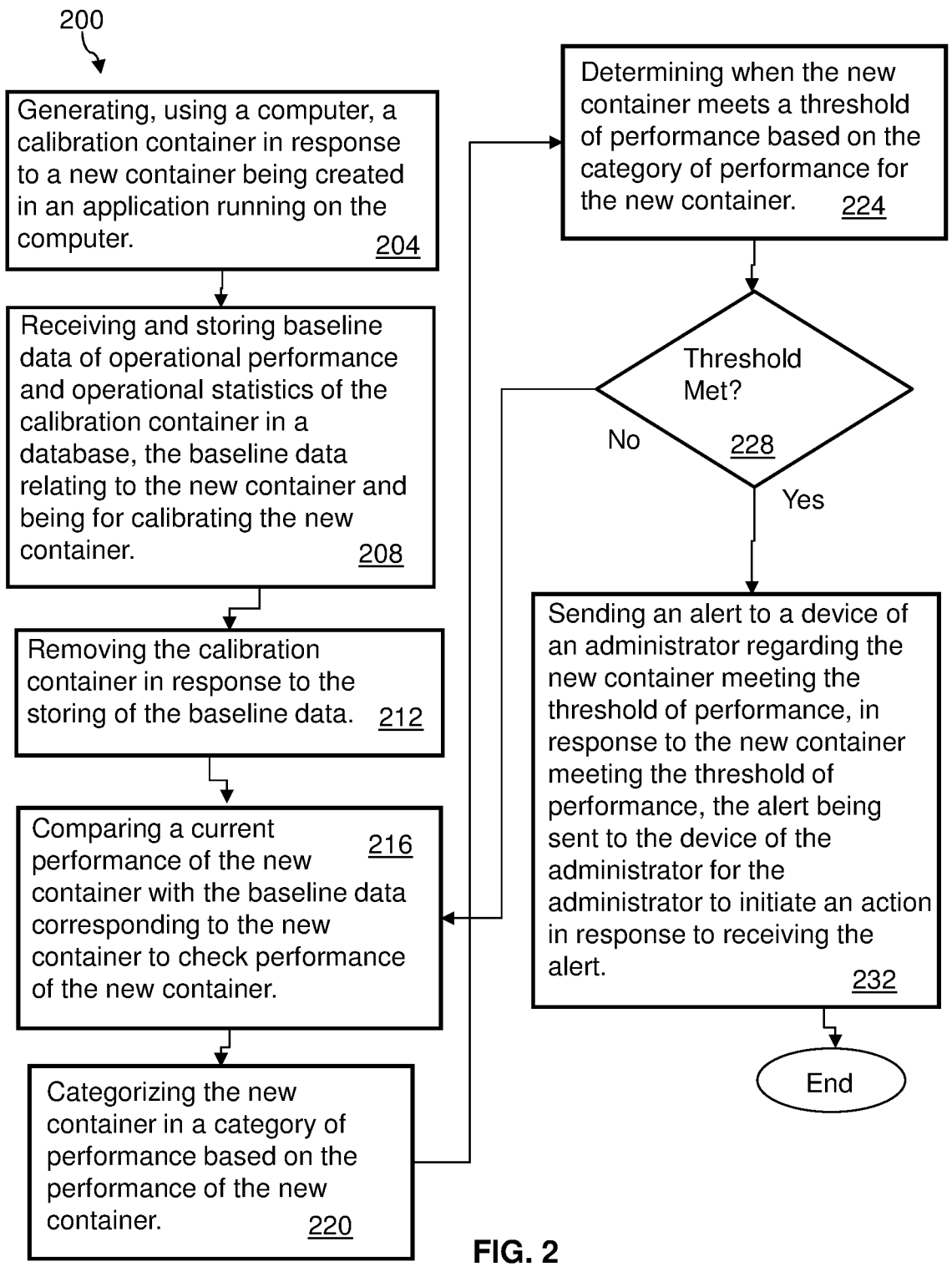
FIG. 2 is a flow chart illustrating a method, implemented using the system shown in FIG. 1, for monitoring and enhancing performance of containers using a calibration technique, according to an embodiment of the present disclosure.
Figure 3:
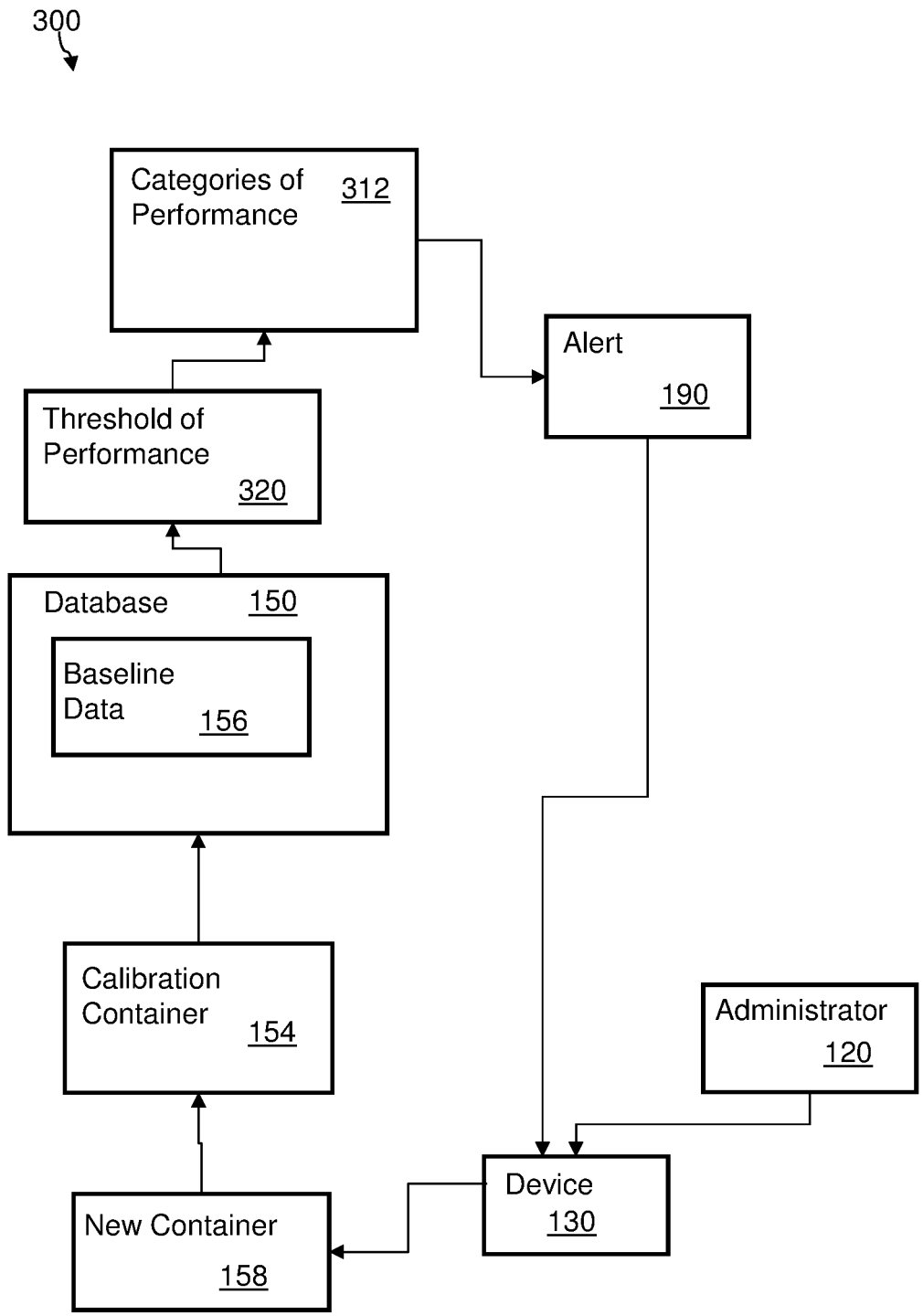
FIG. 3 is a functional schematic block diagram showing a series of operations and functional methodologies, for instructional purposes illustrating functional features of the present disclosure associated with the embodiments shown in the FIGS., for monitoring and enhancing performance of containers using a calibration technique.

Referring to FIGS. 1, 2 and 3, a computer-implemented method 200 is used for monitoring and enhancing performance of containers using a calibration technique, according to an embodiment of the present disclosure.

The method 200 includes a-series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes generating, using a computer 150, a calibration container 154 in response to a new container 158 being created in an application 151 running on the computer 150, as in block 204. For example, a software application can include use of containers. The application communicates or is executed by a processor of a computer 150. With the creation of a new container 158, which represents one or more containers in FIG. 1, a calibration container 154 is generated to facilitate monitoring and enhancing performance of the containers.

The method 200 includes receiving and storing baseline data of operational performance and operational statistics of the calibration container in a database, the baseline data relating to the new container, that is corresponding to the new container, and being for calibrating the new container, as in block 208. The baseline data 156 can be stored in a database or other computer readable storage medium on or communicating with a computer such as computer 150 and or computer 172. Such operational performance and operational statistics can include performance statistic such as idleness of the container, load requirements, processor load, storage requirements.

The method 200 includes removing the calibration container in response to the storing of the baseline data, as in block 212.

The method 200 further including comparing a current performance of the new container with the baseline data corresponding to the new container to check performance of the new container, as in block 216. For example, container performance statistics can be compared to the baseline data to determine variations or changes. In another example, the baseline data can include idleness data for the container which can be compared to idleness data which is current for the corresponding new container.

The method 200 includes categorizing the new container in a category of performance based on the performance of the new container, as in block 220. For example, a category can reflect a performance characteristic of the new container. In another example, a category can be "low performance", or "adequate performance", or "high performance".

The method 200 incudes determining when the new container meets a threshold of performance based on the category of performance for the new container, as in block 224. For example, a threshold can reflect a performance characteristic or parameter. Such performance parameter can include measuring idleness of a container, that is, how long a container is idle. And in one example, that can be measured as a series of idle times, or for one period of time. In one example, a threshold can include a period of time a container is idle, or a percentage of time a container is idle. In another example, a threshold can include no activity, or a lack of activity, on top of, or over, a baseline. Such lack of activity can help to identify idle containers.

When a threshold is not met at block 228, the method can return to block 216. When a threshold is met at block 228, the method can continue to block 232.

The method 200 includes sending an alert to a device 130 of an administrator 120 regarding the new container meeting the threshold of performance, in response to the new container meeting the threshold of performance, as in block 232. The alert is sent to the device of the administrator for the administrator to initiate an action in response to receiving the alert, also in block 232. For example, an alert can include a text message or other electronic message. The alert can be sent to a device such as a computer or mobile device of an administrator. The administrator can be an individual or a representative of an institution or company which can be monitoring computer and software performance which includes containers. In one example, an action can include removing containers which do not meet a threshold. For instance, a container that meets a threshold for idleness, that is, the container is idle or remains idle for a time period or a total amount of time, can be removed, and thereby not require resources such as power, processing power, or computer readable storage medium space. Thus, embodiments of the present disclosure can increase performance by reducing or eliminating containers, and thereby reducing load or requirements for computer resources.

In one example, the method can further include generating, using the computer, a calibration container in response to the new container being created in the application running on the computer. The method includes receiving and storing the baseline data of operational performance and operational statistics of the calibration container in a database, and the baseline data can relate to the new container and is for calibrating the new container.

In another example, the method can include removing the calibration container in response to the storing of the baseline data.

In another example, the method further includes initiating an action regarding the new container, in response to the alert, which can include a new container meeting the threshold for performance. The action can be initiated by the administrator to address the new container meeting the threshold for performance. The threshold for performance can indicate a lack of performance for the new container.

In another example, the performance includes performance characteristics and the performance characteristics can include a ranking of idleness of the new container. The performance can include performance characteristics and the performance characteristics can include a ranking of idleness, and operation behavior.

In another example, the category can indicate a state of performance of the new container. The state of performance can be based on a level of idleness of the new container, and the level of idleness can be related to the threshold of performance.

In one embodiment according to the present disclosure, a model in conjunction with the techniques described above can be generated to facilitate monitoring and enhancing performance of the containers. Generating the model can include at least in part incorporating the calibration container as part of the model. The method can include analyzing the baseline data as at least part of the model. The method can include updating the categorization of the new container based in the analyzing of the baseline data as at least part of the model. The determining when the new container meets the threshold of performance based on the category of performance, can be based on the model.

In one example, the model can include iteratively receiving the baseline data as at least part of the model. For example, the baseline data can be interactively updated by received baseline data by the computer which updates the previously received baseline data.

In one example, the method further includes a plurality of categories. The plurality of categories each indicating a state of performance for the new container.

In one example, the method further includes a plurality of categories, and the plurality of categories each indicate a state of performance for the new container. The categories each refer to a ranking of idleness for the new container.

In one example, the categorizing of the new container is based on the checking of the performance which includes defining a variation from the baseline of the calibration container.

In one example, the method further includes a plurality of categories, and the categories each indicating a state of performance for the new container. The state of performance for the new container can be based on a variation from the baseline data corresponding to the new container.

In one example, the plurality of categories can include a series of categories based on a ranking of idleness of the new container.

In one example, the method further includes a plurality of categories, and the categories each indicating a state of performance for the new container. The plurality of categories can each refer to a ranking of idleness for the new container. The plurality of categories can include a no-variation from the baseline category, a low variation from the baseline category, a medium variation from the baseline category, and a high variation from the baseline category.

In one example, the method further includes generating another calibration container in response to another container being moved from one environment to another environment. For example, the calibration container and the another calibration container can be related to the new container and the another container, respectively.

In another example, the method further includes a plurality of new containers having respective calibration containers being generated in response to the creating of the new containers. The method can include checking performance, using the computer, of each of the new containers, by comparing a current performance for each of the new containers with baseline data corresponding to each of the new containers. The baseline data can be derived from the calibration containers corresponding to each of the new containers. The method can include categorizing each of the new containers in a category of performance based on the checking of the performance for each of the new containers. The method can include determining when the new containers meets a threshold of performance based on the category of performance for each of the new containers. The method can include sending an alert to the device of the administrator regarding each of the new containers meeting the threshold of performance, in response to the new containers meeting the threshold of performance. The alert can be sent to the device of the administrator for the administrator to initiate an action pertaining to one or more of the new containers in response to receiving the alert.

Thus, according to the embodiments of the present disclosure, a corresponding calibration container is created in response to a new container. The calibration container receives or is feed data as input, and the calibration container can be used as a baseline to evaluate the corresponding new container.

Other Embodiments and Examples

Referring to FIG. 1, the device 130, also can be referred to as a user device or an administrator's device, includes a computer 131 having a processor 132 and a storage medium 134 where an application 140, can be stored. The application can embody the features of the method of the present disclosure as instructions. The user can connect to a learning engine 150 using the device 130. The device 130 which includes the computer 131 and a display or monitor 138. The application 140 can embody the method of the present disclosure and can be stored on the computer readable storage medium 134. The device 130 can further include the processor 132 for executing the application/software 140. The device 130 can communicate with a communications network 160, e.g., the Internet.

It is understood that the user device 130 is representative of similar devices which can be for other users, as representative of such devices, which can include, mobile devices, smart devices, laptop computers etc.

In another example and embodiment, profiles can be saved for users/participants. Such profiles can supply data regarding the user and history of deliveries for analysis. When a profile is not found at block 112, the method creates a profile at block 116.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the methods and systems of the present disclosure. Additionally, the functional system 300, according to an embodiment of the present disclosure, depicts functional operation indicative of the embodiments discussed herein.

More Embodiments and Examples

Figure 5:
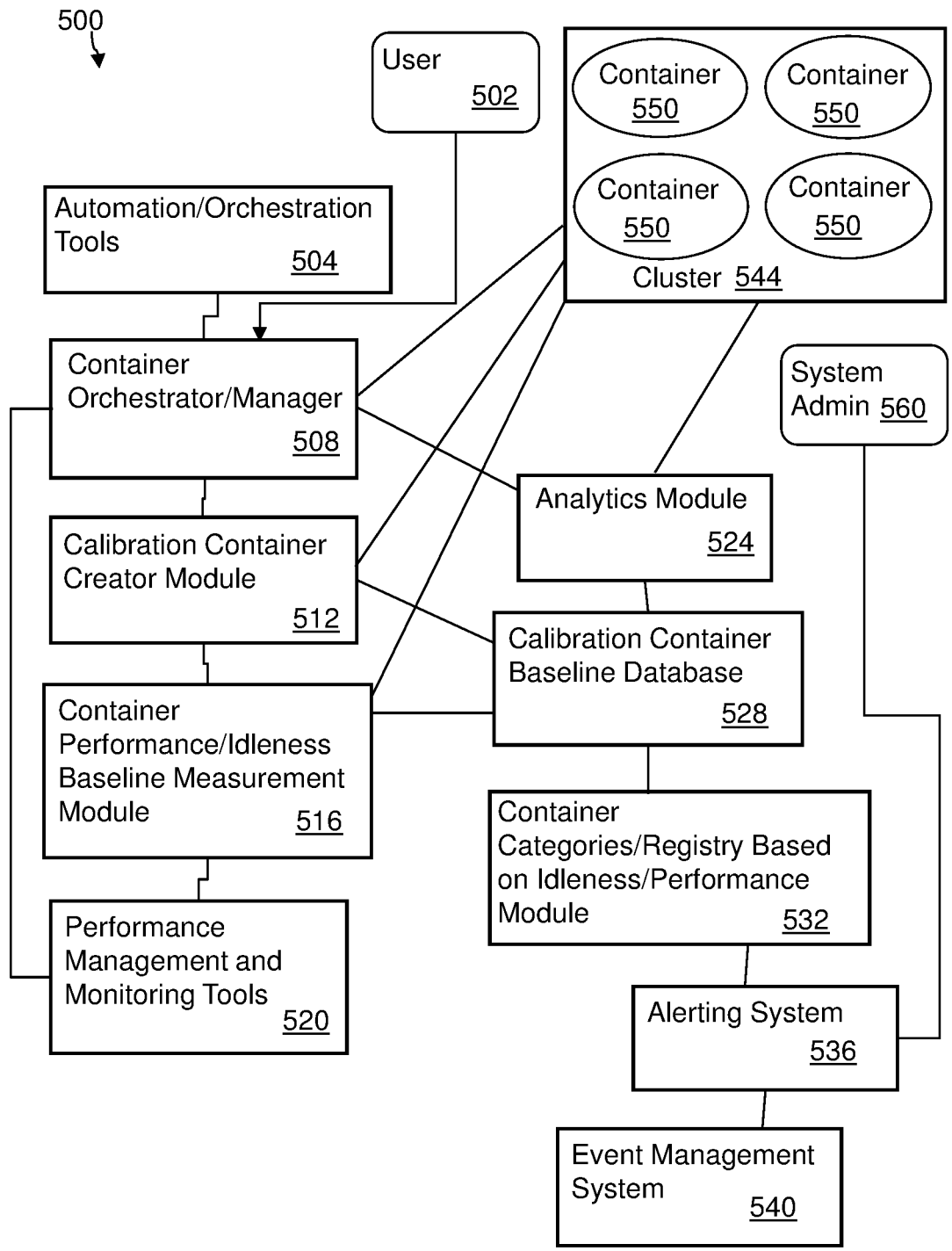
FIG. 5 is a functional block diagram illustrating another system, which can be implemented, at least in part, in coordination with the system shown in FIG. 1, for monitoring and enhancing performance of containers using a calibration technique, according to an embodiment of the present disclosure.

Referring to FIG. 5, in one embodiment according to the present disclosure, a system 500 for using and calibrating containers can include components as depicted. A user 502 can use a container orchestrator/manager 508 for initiating calibration containers 550 which can be part of a cluster of calibration containers 544. The system can automatically create a calibration container(s) corresponding to the creation of actual application container(s)/PODs. A user can initiate the orchestrator to create the apps container. A calibration container corresponding to the apps container can be created automatically by the system.

The manager 508 can communicate with an analytics module 524. A calibration container baseline database 528 can communicate with the calibration container creator module 512. The system also includes a container categories/registry based on idleness/performance module 532 for storing performance data. Also, automation/orchestration tools 504 can be used to initiate calibration containers. A calibration container creator module 512 can be used create the calibration containers 550. A container performance/idleness baseline measurement module 516 can be used to measure performance of the containers, using a performance management and monitoring tool 520. An alerting system 536 can be used for alerting a system administrator 560 regarding the performance of the containers. An event management system 540 can communicate with the alerting system. The event management system can manage events, for example, initiated by the system administrator, for example, removing a container.

Implementation according to the present disclosure includes container orchestration engines, container managers, and performance management and monitoring tools. In one embodiment according to the present disclosure, referring to FIG. 5, the system 500 for using and calibrating containers can include components as depicted. And in one example, as new containers 550 are deployed, an additional temporary instance of a container are automatically created in an isolated environment (e.g., separate container pod). The baseline attributes (e.g., image version) and performance of the isolated instance is measured, including disk input/output (I/O), CPU (central processing unit), memory, and sockets. The container can be automatically removed at the conclusion of the baseline period. The actual user deployed container is deployed as normal, and the ongoing performance of the actual instance is measured, including disk I/O, CPU, memory, and sockets. The system thus has a baseline and ongoing performance measurements which can be used to create a model using a calibration container creator module 512. The system includes determining which containers are idle, and/or inactive using a container performance/idleness baseline measurement module 516, and determining which containers are scaled inefficiently (e.g. auto-scaling boundaries incorrect). Further, the system includes determining which containers are running older versions of code, and determining if a new version of code is running as efficiently (or more/less) than the prior version. During the next deployment of the component/application, baselines are reassessed, and compared against previous iterations/versions. Unused versions of the container image are scanned, and included in the analysis for the developer. A report can be generated and provided to the developer or administrator, including, for example, performance data for the new release (e.g., now using 5% less resources); status of running containers—including idle, too highly scaled, inactive images; information about unused versions in the repository (e.g., 7 versions, 1 active, 1 for rollback, recommend deleting 5). A decision can also be triggered based on that data (e.g., scale down, clear old image), using an alerting system 536.

Embodiments of the present disclosure provide a platform solution that does not rely on a developer fully instrumenting and performance managing applications, for example, in development/test environments. Thus, methods and systems according to the present disclosure does not need developer driven solutions. Embodiments of the present disclosure provide automatic isolated environment baseline generation and capture, and machine learning driven recommendations and actions.

Further, embodiments according to the present disclosure include a platform led single change that achieves the outcomes, that would otherwise require many developers to actively change their behaviors. A system and associated methods according to the present disclosure include calibration containers used as a baseline to measure the performance and idleness of containers. Unused containers can be removed from the environment to save money, energy and resources. Also, new relative performance metrics can be derived against each container (or type of containers) running in the environment and that can be used to get insights to the container performance and (mis)behavior. Calibration containers are created each time when an image is used for instantiating a container in a container cluster environment. The baseline performance and operational parameters of the calibration container is recorded in a database along with details of containers in the environment that use the calibration containers as baseline. The method and system can check the performance/idleness of containers in the environment at specified intervals using standard methods and compare it with baseline parameters to create different levels of variation from threshold. The method and system includes determining the variation from thresholds related to performance/idleness of containers at the specific time intervals and the purpose of input request (e.g., identify idle container or identify relative performance details, etc.), further actions related to performance, idleness etc. on each container or group of containers can be taken. An analytics module keeps track of performance data of individual containers, group of containers for same workload, periodic baseline data of containers etc. and provide insights related to the operational behavior or misbehavior of an application. The methods and systems according to the present disclosure can include automatic isolated environment baseline generation & capture. Further, methods and systems can include machine learning driven recommendations and actions including report generation specific to application including idle containers and unused image versions in repository. Decisions can also be triggered based on such insights as above.

In one example embodiment according to the present disclosure, a system can be integrated with container cluster managers and container orchestration engines at the control plane level. The system can also be integrated with existing monitoring/performance management tools (if available). Continuing, whenever a new container is created from an image (based on the image ID (identification), changes from the previous similar container creation in terms of command/resource attributes etc.), calibration container against those container(s) are created. The calibration containers are also created when the containers move from one environment to another environment/cluster. Baseline operational performance and operational statistics of calibration containers are stored in a database along with details of containers in the respective environment that use the calibration containers as baseline. Calibration containers are deleted after recording baseline parameters. The system checks the performance/idleness/operational behavior of container(s) by comparing it with baseline parameters. And, the performance/idleness/operational behavior of the containers depends on the variation from the baseline parameters, containers are placed in different categories such as no variation, low variation, medium variation and high variation. This is checked and updated at frequent intervals. In-built technology can be used to measure the above. CPU (Central Processing Unit), memory, I/O (Input/Output), ports, ingress/egress communication etc., various parameters are measured/analyzed as part of performance checks.

The system can also be integrated with existing monitoring/performance management/system management tools and measure performance against a baseline. Baseline parameters can be refreshed at least once in a day or a defined time period by instantiating containers within the time period and updating the baseline parameters accordingly. In one example, a comparison of baseline parameters can be taken at different time periods (for example, days). Containers in no-variation and low-variation categories are identified and respective owners/administrators are alerted about the idleness to take appropriate action within a defined time period. In one example, an owner/administrator can reduce costs by eliminating low performance containers. Application misbehavior can also be analyzed as above, and alerts sent to respective owners or to the integrated event management system. Container/orchestrator logs can also provide inputs to the system to identify the state of containers and how a container reached a state (e.g., container stopped for a reason, etc.). An analytics module can learn the behavior/idleness of the containers/workloads based on the historical data and performance behaviors, and analyze the relative performance of workloads to provide insights about the container(s) and workloads & their performance/idleness.

Embodiments according to the present disclosure, thus provide container management and workload performance measurement. While containers can be launched at a rapid rate, such ease of creation can result in consuming cloud resources beyond what is needed or desirable. For example, containers can result in a monthly cost for cloud-based resources. Embodiments of the present disclosure provide methods and systems to monitor and scale back containers based on performance of the container. For example, an orderly shutdown of containers no longer in use. Embodiments of the present disclosure provide methods and systems to monitor containers based in the cloud, as opposed to virtual servers or bare metal servers. Such methods and systems can monitor the idleness of a container, for example, measure the actual/accurate resource usage of workloads. Further, the methods and systems can include calibration containers to detect the idle containers and take appropriate action on the idle containers. The calibration containers can also be used as a baseline for monitoring performance of containers. For example, each container can have a different configuration, and the number of VM (virtual machine) cycles consumed by an idle container can vary from container to container.

Additionally, embodiments according to the present disclosure provide a mechanism to properly service and manage containers, and to monitor containers, for example, providing a mechanism to detect idle containers. Calibration containers provide a baseline for monitoring any activity/changes in the container. The method and systems of the present disclosure provide a baseline which can be monitored as automated and for each container in the environment. Further, the method and systems of the present disclosure can provide monitoring for various types (and applications) of containers. For each container, the baseline may be different.

In one example, idle containers do not consume equal resources, and the methods and systems of the present disclosure provide a mechanism to calibrate and detect whether a container is providing services or being used. A calibration container can also help to have a baseline (for example, measuring the performance with respect to the baseline containers with the same type of resources/runtime/libraries etc.) to measure performance of a workload on the container based on a workload type/size and input requests or load. Also, the methods and systems can help to measure behavior/misbehavior details based on the data collected over a period of time. The method and system can measure the idleness of a container because a baseline for the container is known using a calibration container (e.g., request on ports, ports opened while creation, CPU usage, memory usage, etc.). For each container, a baseline may be different, and thus the methods and systems can measure all baseline data, compare it with the same of an actual running container and decide whether the container is idle or not. Additionally, the methods and systems can measure the impact of a load on a container by having a baseline specific to the type (and application) of the container. Calibration containers can spin up, record baseline data into a database and shut down, thus not adding load or requiring cloud resources. And the same process may repeat when a container changes the environment or a baseline becomes old based on a pre-defined threshold. Also, there can be one such calibration container if multiple applications use the same image type without any change in input parameters (related to resource/ports etc.). Measuring idleness is only one aspect of the present methods and systems. The real input load and impact (performance behavior/misbehavior) can be measured based on a baseline. The methods and systems can eliminate continuous monitoring, by periodic (or even by one-off) calibration and then overall container statistic collection. This occurs without disturbing the actual running container. In one example, in a new compute environment, a calibrated baseline container can be bootstrapped, measure its resources, and thereby have a sense of the load of the other container without looking into it.

Embodiments according to the present disclosure can include a method and system for automatically creating a calibration container (e.g., an additional temporary instance) in an isolated environment (e.g., a separate container pod) while deploying containers, and using the calibration container as a baseline to measure performance and idleness of the containers in a container cluster environment. More specifically, an example method and system can include creating calibration containers each time an image is used for instantiating container in an environment. The method and system can include utilizing the calibration container as a baseline to measure performance and idleness of containers in the environment. The method and system can include recording performance of the baseline and operational parameters of the calibration container in a database along with details of containers in the environment that use the calibration containers as the baseline. The method and system can include checking for performance/idleness of containers in the environment in specified intervals and comparing with baseline parameters to create different levels of variation from a threshold. The method and system can include providing an analytics module to track performance data of individual containers, group of containers for a same workload, periodic baseline data of containers, and providing insights related operational behavior of an application. The method and system can include providing machine learning driven recommendations and actions including report generation specific to application including idle containers and unused image versions in a repository to help in triggering decisions. The method and system can include automatically creating a calibration container in an isolated environment while deploying new containers, and using the calibration container as a baseline to measure performance and idleness of containers in a container cluster environment. Thereby, methods and/or system according to the present disclosure can include calibration containers used as a baseline to measure the performance and idleness of containers. Unused containers can be removed from the environment to save money, energy and resources. Also, new relative performance metrics can be derived against each container (or type of containers) running in the environment and that can be used to get insights to the container performance and (mis)behavior. Calibration containers can be created each time when an image is used for instantiating a container in a container cluster environment. The baseline performance and operational parameters of the calibration container can be recorded in a database along with details of containers in the environment that use the calibration containers as baseline. The method can check the performance/idleness of containers in the environment at specified intervals using standard methods and compare it with baseline parameters to create different levels of variation from threshold. And depending on the variation from thresholds, related to performance/idleness of containers at the specific time intervals and the purpose of input request (e.g. Identify idle container or identify relative performance details etc.), further actions related to performance, idleness etc. on each container or group of containers can be taken. An analytics module keeps track of performance data of individual containers, group of containers for same workload, periodic baseline data of containers etc. and provide insights related to the operational (mis)behavior of application. Also, the method can include automatic isolated environment baseline generation and capture. Machine learning driven recommendations and actions including report generation specific to application including idle containers and unused image versions in repository, can be generated. Decisions can also be triggered based on the above, including insights from the performance data.

The method and/or systems according to the present disclosure can include assessing performance of containers by creating a calibration container to measure the actual baseline of the container which is one among the multiple containers of an application. In one example, containers can move across clusters in a hybrid multi cloud environment, and each environment can be different. Thus, a baseline can change as a container in moved. Method and/or systems of the present disclosure can identify changes in an environment and record a new baseline. And the baseline considered is not just a few defined characteristics of an application, the baseline according to the present disclosure provides data as described herein as related to the calibration containers. For example, a complete baseline of container and associated application parts running in the container and related micro services (e.g., containers) of the application.

More Examples and Embodiments

Figure 4:
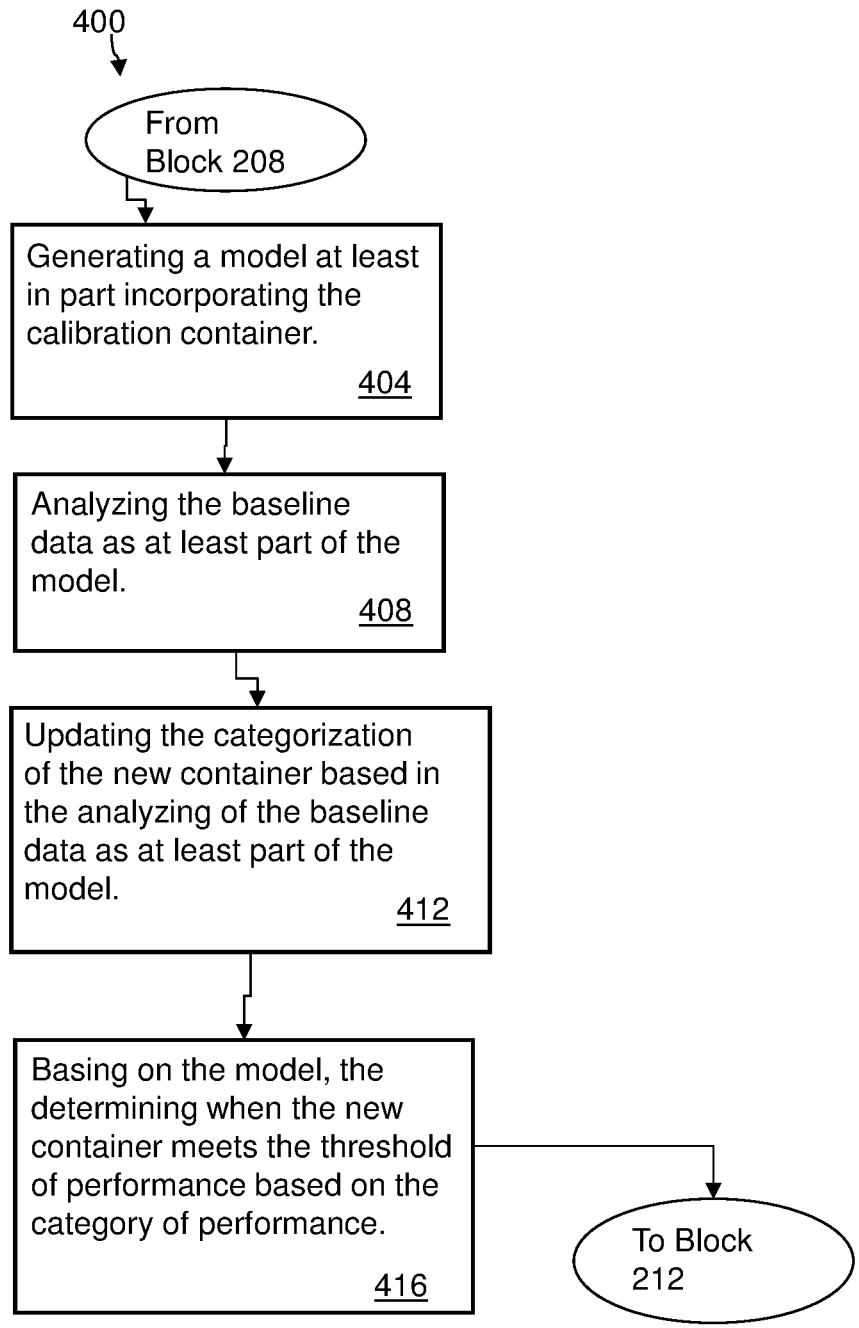
FIG. 4 is a flow chart illustrating another method, which continues from the flow chart of FIG. 2, for monitoring and enhancing performance of containers using a calibration technique, according to an embodiment of the present disclosure.

Operational blocks and system components shown in one or more of the figures may be similar to operational blocks and system components in other figures. The diversity of operational blocks and system components depicting example embodiments and aspects according to the present disclosure. For example, the method shown in FIG. 4 is intended as another example embodiment which can include aspects/operations shown and discussed previously in the present disclosure, in one example, continuing from a previous method shown in associated flow chart.

Additional Examples and Embodiments

Figure 6:
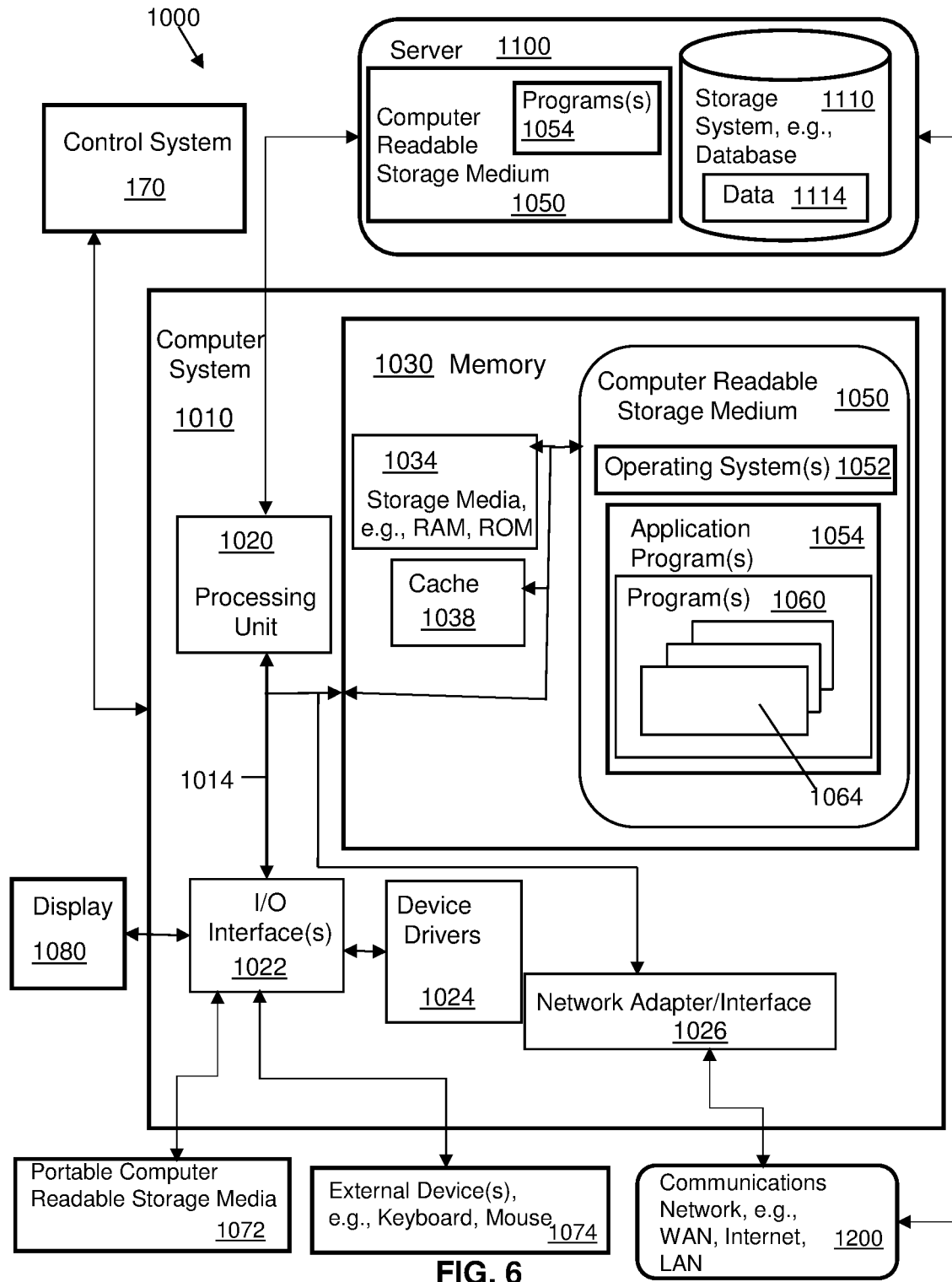
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 6). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 140, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 140 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 6 and described in more detail in regards thereto referring to one or more computer systems 1010.

Thus, in one example, a control system 170 is in communication with the computer 131 or device 130, and the computer can include the application or software 140. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 140, which can include program instructions executable using a processor 132. These features are shown herein in FIG. 1, and also in an embodiment of a computer system shown in FIG. 6 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 140. In one example, the application 140 is stored on a device, for example, a computer or device on location 130, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 140. The application 140 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any energy end user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model for monitoring and enhancing performance of containers using a calibration technique.

In another example, the control system 170 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Figure 9:
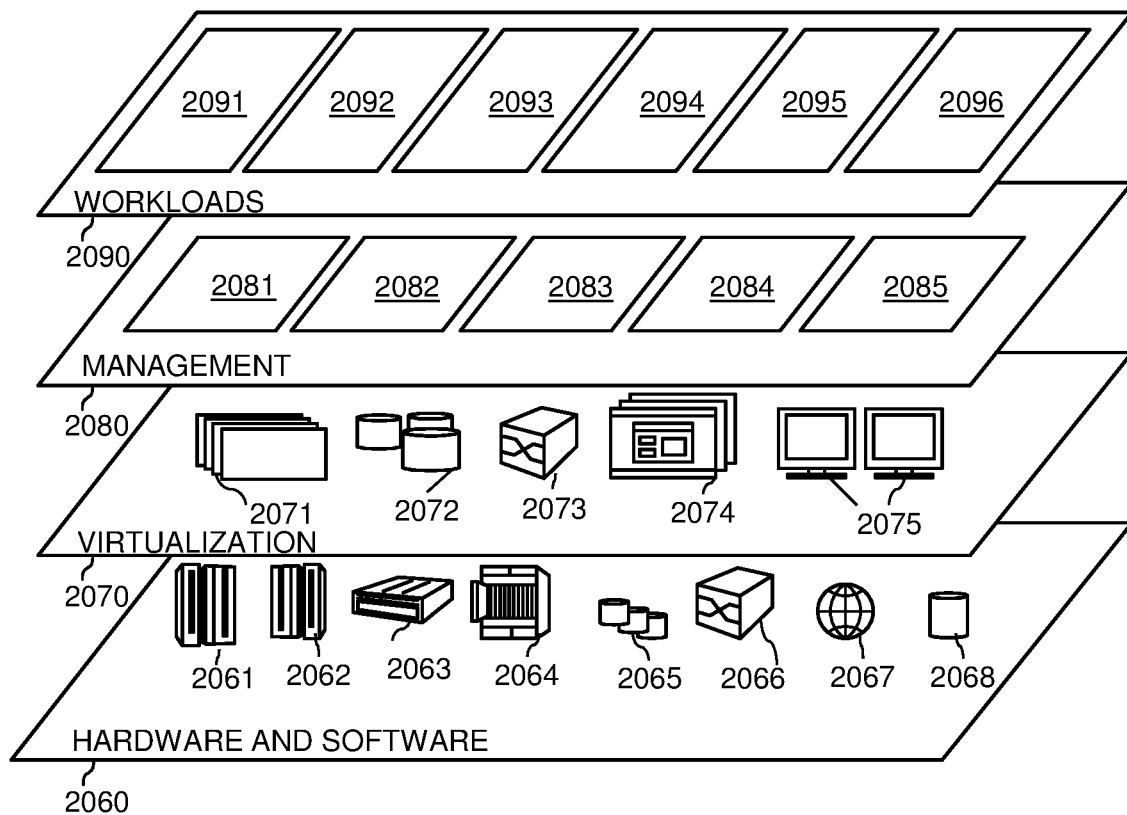
FIG. 9 is a block diagram depicting abstraction model layers according to an embodiment of the present invention.

Referring to FIG. 9, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embodiment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 7:
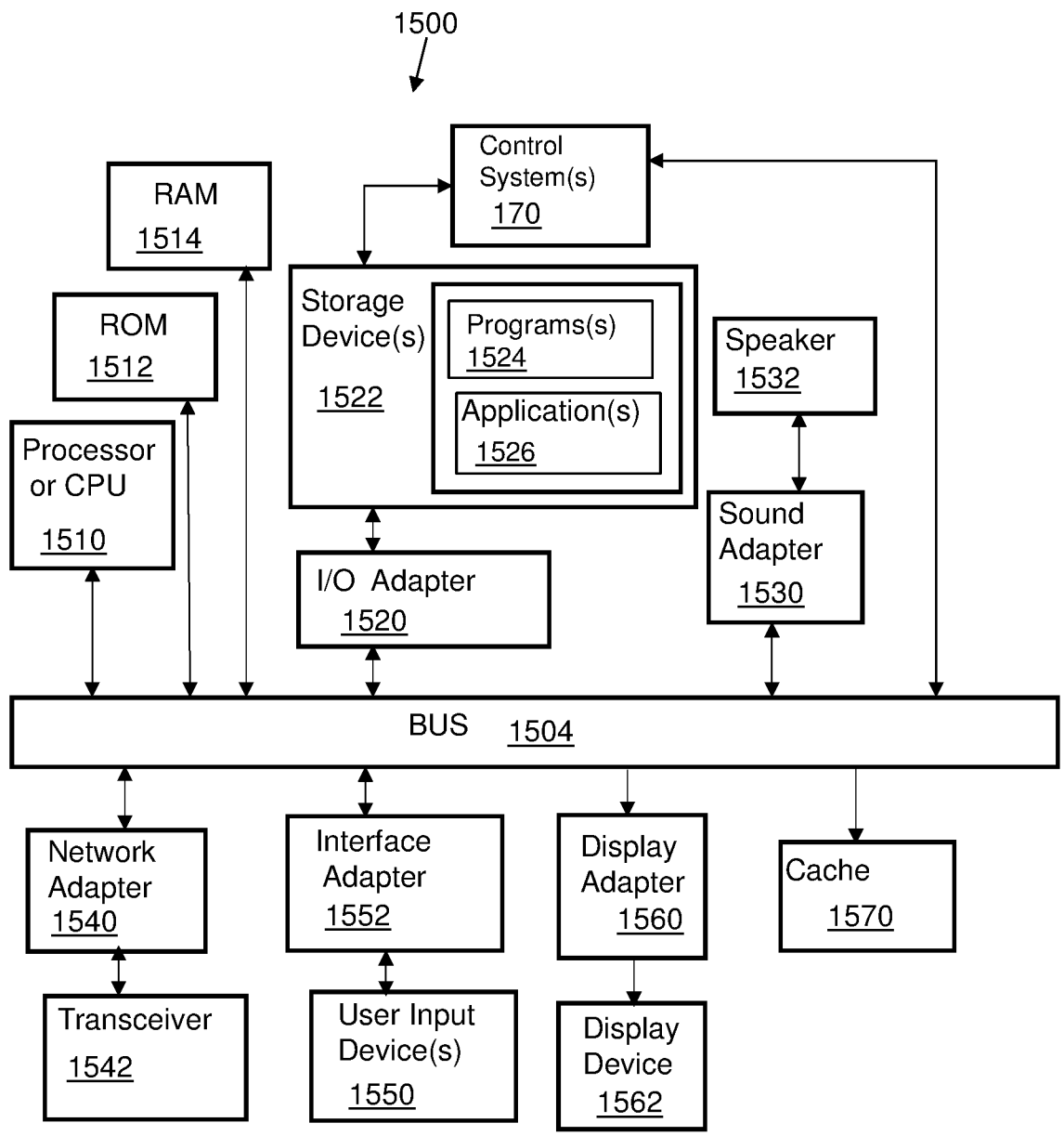
FIG. 7 is a schematic block diagram of a system depicting system components interconnected using a bus. The components for use, in all or in part, with the embodiments of the present disclosure, in accordance with one or more embodiments of the present disclosure.

Referring to FIG. 7, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which communicates with the system bus, and thus can communicate with the other components of the system via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
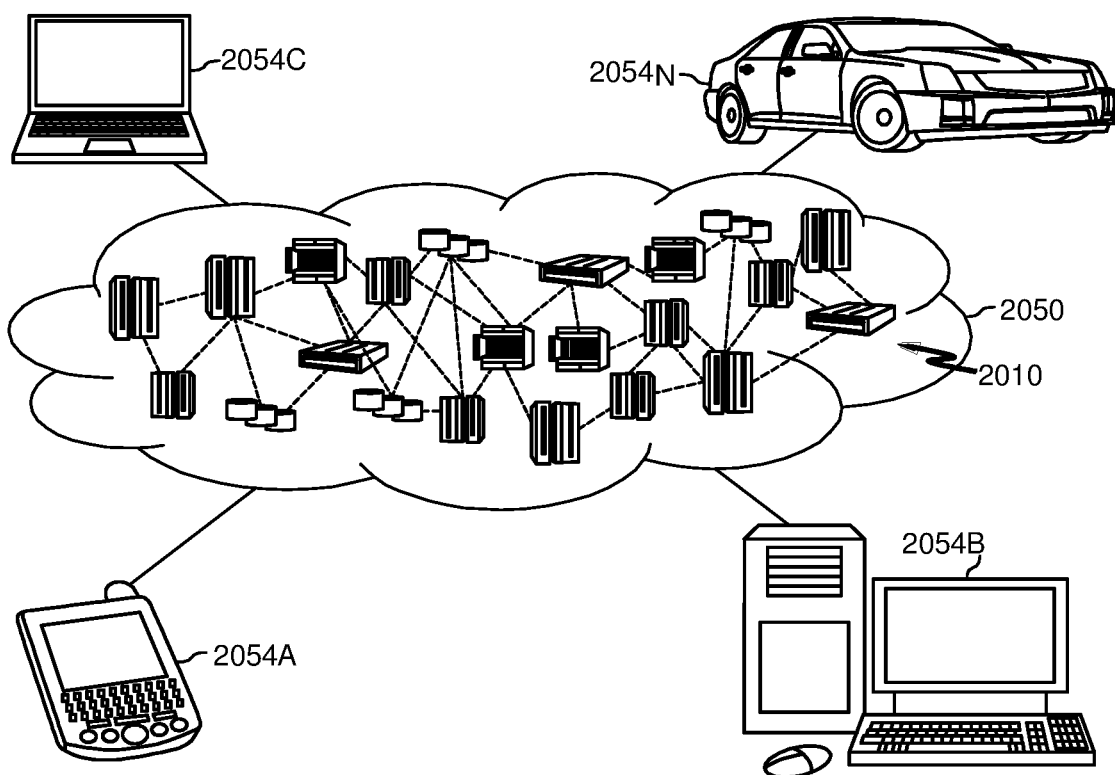
FIG. 8 is a block diagram depicting a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and monitoring and enhancing performance of computer components 2096, for example, monitoring and enhancing performance of containers using a calibration technique.

What is claimed is:

1. A computer-implemented method comprising:
monitoring and enhancing performance of containers running on a computer, the monitoring and enhancing comprising:
checking performance, using the computer, of a new container as part of an application running on the computer, by comparing a current performance of the new container with baseline data corresponding to the new container, the baseline data being derived from a calibration container corresponding to the new container;
categorizing the new container in a category of performance based on the checking of the performance of the new container;
determining when the new container meets a threshold of performance based on the category of performance for the new container; and
sending an alert to a device of an administrator regarding the new container meeting the threshold of performance, in response to the new container meeting the threshold of performance, the alert being sent to the device of the administrator for the administrator to initiate, in response to receiving the alert, an action pertaining to the new container to enhance performance of containers running on the computer, where enhancing performance of the containers running on the computer includes initiating the action regarding the new container, the action being initiated to address the new container meeting the threshold for performance, the threshold for performance indicating a lack of performance for the new container.

2. The method of claim 1, further comprising:
generating, using the computer, a calibration container in response to the new container being created in the application running on the computer; and
receiving and storing the baseline data of operational performance and operational statistics of the calibration container in a database, the baseline data relating to the new container and being for calibrating the new container.

3. The method of claim 2, further comprising:
removing the calibration container in response to the storing of the baseline data.

4. The method of claim 1, wherein the performance includes performance characteristics and the performance characteristics include a ranking of idleness of the new container.

5. The method of claim 1, wherein the performance includes performance characteristics and the performance characteristics include a ranking of idleness, and operation behavior.

6. The method of claim 1, wherein the category indicates a state of performance of the new container, the state of performance being based on a level of idleness of the new container, and the level of idleness being related to the threshold of performance.

7. The method of claim 1, further comprising:
generating a model at least in part incorporating the calibration container;
analyzing the baseline data as at least part of the model;
updating the categorization of the new container based in the analyzing of the baseline data as at least part of the model; and
wherein the determining when the new container meets the threshold of performance based on the category of performance, is based on the model.

8. The method of claim 1, further comprising:
a plurality of categories, and the plurality of categories each indicating a state of performance for the new container.

9. The method of claim 1, further comprising:
a plurality of categories, and the plurality of categories each indicating a state of performance for the new container; and
wherein the categories each refer to a ranking of idleness for the new container.

10. The method of claim 1, wherein the categorizing of the new container is based on the checking of the performance which includes defining a variation from the baseline of the calibration container.

11. The method of claim 1, further comprising:
a plurality of categories, and the categories each indicating a state of performance for the new container; and
the state of performance for the new container being based on a variation from the baseline data corresponding to the new container.

12. The method of claim 1, wherein the plurality of categories includes a series of categories based on a ranking of idleness of the new container.

13. The method of claim 1, further comprising:
a plurality of categories, and the categories each indicating a state of performance for the new container, wherein the plurality of categories each refer to a ranking of idleness for the new container; and
the plurality of categories includes a no-variation from the baseline category, a low variation from the baseline category, a medium variation from the baseline category, and a high variation from the baseline category.

14. The method of claim 1, further comprising:
generating another calibration container in response to another container being moved from one environment to another environment; and
the calibration container and the another calibration container being related to the new container and the another container, respectively.

15. The method of claim 1, further comprising:
a plurality of new containers having respective calibration containers being generated in response to the creating of the new containers; and
checking performance, using the computer, of each of the new containers, by comparing a current performance for each of the new containers with baseline data corresponding to each of the new containers, the baseline data being derived from the calibration containers corresponding to each of the new containers;
categorizing each of the new containers in a category of performance based on the checking of the performance for each of the new containers;

determining when the new containers meets a threshold of performance based on the category of performance for each of the new containers; and sending an alert to the device of the administrator regarding each of the new containers meeting the threshold of performance, in response to the new containers meeting the threshold of performance, the alert being sent to the device of the administrator for the administrator to initiate an action pertaining to one or more of the new containers in response to receiving the alert.

16. A system using a computer for monitoring and enhancing performance of containers using a calibration technique, which comprises:

a computer system comprising;

a computer processor, a computer-readable storage medium, and program instructions stored on the computer-readable storage medium being executable by the processor, to cause the computer system to perform the following functions to:

monitor and enhance performance of containers running on a computer, the monitor and enhance performance comprising:

check performance, using the computer, of a new container as part of an application running on the computer, by comparing a current performance of the new container with baseline data corresponding to the new container, the baseline data being derived from a calibration container corresponding to the new container;

categorize the new container in a category of performance based on the checking of the performance of the new container;

determine when the new container meets a threshold of performance based on the category of performance for the new container; and send an alert to a device of an administrator regarding the new container meeting the threshold of performance, in response to the new container meeting the threshold of performance, the alert being sent to the device of the administrator for the administrator to initiate, in response to receiving the alert, an action pertaining to the new container to enhance performance of containers running on the computer, where enhancing performance of the containers running on the computer includes initiating the action regarding the new container, the action being initiated to address the new container meeting the threshold for performance, the threshold for performance indicating a lack of performance for the new container.

17. The system of claim 16, further comprising:

generating, using the computer, a calibration container in response to the new container being created in the application running on the computer; and receiving and storing the baseline data of operational performance and operational statistics of the calibration container in a database, the baseline data relating to the new container and being for calibrating the new container.

18. The system of claim 16, further comprising:

removing the calibration container in response to the storing of the baseline data.

19. A computer product for monitoring and enhancing performance of containers using a calibration technique, the computer product comprising:

a computer readable storage medium having program instructions embodied therewith, the program instructions executable by a computer to cause the computer to perform functions, by the computer, comprising the functions to:

monitor and enhance performance of containers running on a computer, the monitor and enhance performance comprising:

check performance, using the computer, of a new container as part of an application running on the computer, by comparing a current performance of the new container with baseline data corresponding to the new container, the baseline data being derived from a calibration container corresponding to the new container;

categorize the new container in a category of performance based on the checking of the performance of the new container;

determine when the new container meets a threshold of performance based on the category of performance for the new container; and send an alert to a device of an administrator regarding the new container meeting the threshold of performance, in response to the new container meeting the threshold of performance, the alert being sent to the device of the administrator for the administrator to initiate, in response to receiving the alert, an action pertaining to the new container to enhance performance of containers running on the computer, where enhancing performance of the containers running on the computer includes initiating the action regarding the new container, the action being initiated to address the new container meeting the threshold for performance, the threshold for performance indicating a lack of performance for the new container.

* * * * *